United States Patent [19]

Dehennau

[11] Patent Number: 4,959,269

[45] Date of Patent: Sep. 25, 1990

[54] STRUCTURES WITH MULTIPLE POLYMERIC LAYERS COMPRISING A LAYER OF VINYLI-DENE FLUORIDE POLYMER BONDED TO A LAYER OF PLASTICIZED VINYL CHLORIDE POLYMER AND USE OF THESE STRUCTURES FOR THE MANUFACTURE OF FLEXIBLE PACKAGING

[75] Inventor: Claude Dehennau, Waterloo, Belgium

[73] Assignee: Solvay & Cie (Societe Anonyme), Brussels, Belgium

[21] Appl. No.: 291,654

[22] Filed: Dec. 29, 1988

[30] Foreign Application Priority Data

Jan. 8, 1988 [BE] Belgium ............................. 08800018

[51] Int. Cl.$^5$ ............................................. B32B 27/08
[52] U.S. Cl. .................................... 428/421; 428/518; 428/520

[58] Field of Search ........................ 428/421, 518, 520

[56] References Cited

U.S. PATENT DOCUMENTS 4,296,017 10/1981 Weissgerber et al. .............. 428/518
4,585,694 4/1986 Dehennau ........................... 428/421
4,659,625 4/1987 Decroly et al. .

Primary Examiner—Thomas J. Herbert
Attorney, Agent, or Firm—Stevens, Davis, Miller & Mosher

[57] ABSTRACT

The vinylidene fluoride polymer layer is bonded to that of plasticized vinyl chloride polymer by means of a mixture of adhesives consisting of a copolymer of vinyl acetate and of ethylene and of a copolymer of vinyl chloride and of vinyl acetate, the said mixture containing from 36 to 95% by weight of vinyl acetate and exhibiting a dynamic viscosity equal to at least 55 kPa s at 100° C. and 11 s$^{-1}$.

8 Claims, No Drawings

STRUCTURES WITH MULTIPLE POLYMERIC LAYERS COMPRISING A LAYER OF VINYLI-DENE FLUORIDE POLYMER BONDED TO A LAYER OF PLASTICIZED VINYL CHLORIDE POLYMER AND USE OF THESE STRUCTURES FOR THE MANUFACTURE OF FLEXIBLE PACKAGING

The present invention relates to structures with multiple polymeric layers comprising a layer of vinylidene fluoride polymer bonded to a layer of plasticized vinyl chloride polymer, in which the vinylidene fluoride polymer is bonded to the plasticized vinyl chloride polymer by means of polymeric adhesives, and to the use of these structures for the manufacture of flexible packaging.

It is known to combine different polymers, each contributing its specific properties and advantages, within a structure with multiple polymeric layers (multilayer composite).

Patent Application FR-A-84/06,372, which corresponds to U.S. Pat. No. 4,659,625, SOLVAY & Cie) describes structures in which a layer of vinylidene fluoride polymer is combined with a layer of plasticized vinyl chloride polymer by means of a polymeric adhesive consisting of a copolymer of vinyl acetate and of ethylene containing from 60 to 90% by weight of vinyl acetate. Although the polymeric adhesives in question form good adhesives at ambient temperature, their delamination resistance decreases greatly with an increase in temperature, and this limits their outlets in fields where a high delamination resistance when heated is not required.

The present invention is aimed at providing structures with multiple polymeric layers comprising a layer of vinylidene fluoride polymer bonded to a layer of plasticized vinyl chloride polymer which have a markedly improved delamination resistance when heated.

To this end, the invention provides structures with multiple polymeric layers comprising a layer of vinylidene fluoride polymer bonded to a layer of plasticized vinyl chloride polymer by means of a mixture of polymeric adhesives consisting of a copolymer of vinyl acetate and of ethylene and of a copolymer of vinyl chloride and of vinyl acetate, the said mixture containing from 36 to 95% by weight of vinyl acetate and exibiting a dynamic viscosity equal to at least 55 kPa s at 100° C. and 1 s$^{-1}$.

It has been found that, in contrast to the copolymers of vinyl acetate and of ethylene recommended in the prior art, mixtures of such copolymers with copolymers of vinyl chloride and acetate adhere perfectly at elevated temperature to vinylidene fluoride polymers and to plasticized vinyl chloride polymers, provided that the vinyl acetate content of the said mixtures is between 36 and 95% by weight and that their dynamic viscosity is equal to at least 55 kPa s at 100° C. and 1 s$^{-1}$.

The invention lies, therefore, essentially in resorting to a mixture of a vinyl acetate copolymer and a vinyl chloride copolymer such as defined above in order to bond and cause the adhesion of a layer of vinylidene fluoride polymer to a layer of plasticized vinyl chloride polymer in the production of structures with multiple polymeric layers.

Structures with multiple polymeric layers comprising a layer of vinylidene fluoride polymer bonded to a layer of plasticized vinyl chloride polymer are intended, therefore, to denote the multilayer structures containing at least one layer of vinylidene fluoride polymer bonded to at least one layer of plasticized vinyl chloride polymer. The structures with multiple polymeric layers according to the invention may therefore contain one or more layers of vinylidene fluoride polymer bonded to one or more layers of plasticized vinyl chloride polymer, it being possible for these layers themselves to be bonded to layers of other polymers.

A copolymer of vinyl acetate and of ethylene is intended to denote the copolymers of vinyl acetate and of ethylene containing at least 50% by weight of vinyl acetate. The best results are obtained with binary copolymers of vinyl acetate and of ethylene containing from 60 to 99% by weight of vinyl acetate and, still more particularly, with those containing from 70 to 95% by weight of vinyl acetate, which are consequently given preference.

The copolymers of vinyl acetate and ethylene such as defined above are polymers which are more or less tacky and, as a result of this, difficult to use. In order to overcome this disadvantage it is particularly advantageous to employ a copolymer of vinyl acetate and of ethylene, coated with a thermoplastic polymer. According to a preferred embodiment of the invention, a copolymer of vinyl acetate and of ethylene coated with a thermoplastic polymer is therefore employed. By way of examples of such thermoplastic polymers, there may be mentioned vinylidene fluoride polymers and vinyl chloride polymers. A thermoplastic coating polymer which is very particularly preferred is polyvinyl chloride. The thermoplastic coating polymer is generally present in a proportion not exceeding approximately 10% by weight of the coated acetate polymer.

The coating of the copolymer of vinyl acetate and of ethylene with a thermoplastic polymer may be carried out, for example, by adding a thermoplastic polymer latex to a vinyl acetate copolymer latex and coagulating the whole, for example by adding an electrolyte.

A copolymer of vinyl chloride and of vinyl acetate is intended to denote the copolymers of vinyl chloride and vinyl acetate containing at least 50% by weight of vinyl chloride. The best results are obtained with the binary copolymers of vinyl chloride and acetate containing from 60 to 98% by weight of vinyl chloride and, still more particularly, with those containing from 80 to 95% by weight of vinyl chloride.

The relative proportions of vinyl acetate copolymer and of vinyl chloride copolymer in the mixture of polymeric adhesives may vary within wide limits, provided that the vinyl acetate content of the mixture is between 36 and 95% by weight and that its dynamic viscosity at 100° C. and 1 s$^{-1}$ is at least 55 kPa s.

Nevertheless, preference is given to mixtures in which the vinyl acetate content is between 36 and 90% by weight and whose dynamic viscosity at 100° C. and 1 s$^{-1}$ is at least 60 kPa s.

According to a particularly preferred embodiment, mixtures of polymeric adhesives according to the invention are employed, in which the product of the weight content of vinyl acetate, expressed in percent, multiplied by the dynamic viscosity at 100° C. and 1 s$^{-1}$, expressed in kPa s, is greater than $3 \times 10^3$ and still more particularly greater than $3.5 \times 10^3$.

Where adhesion is concerned, there is no disadvantage in employing mixtures of polymeric adhesives whose dynamic viscosity may be very high. Nevertheless, in practice the dynamic viscosity of the mixtures of polymeric adhesives at 100° C. and 1 s$^{-1}$ is generally limited to 300 kPa s, particularly for reasons of ease of use.

A vinylidene fluoride polymer is intended to denote all the polymers containing at least 85 mol% and preferably at least 90 mol% of monomer units derived from vinylidene fluoride. The vinylidene fluoride polymers which are suitable for the production of the multilayer structures according to the invention include, therefore, both vinylidene fluoride homopolymers and vinylidene fluoride copolymers containing monomeric units derived from one or more comonomers. Preference is given to polymers containing at least 90 mol% of monomeric units derived from vinylidene fluoride, any remainder preferably consisting of monomeric units derived from other fluoroolefins such as vinyl fluoride, trifluoroethylene, chlorotrifluoroethylene, tetrafluoroethylene and hexafluoropropylene.

A vinyl chloride polymer is intended in this case to denote the polymers containing at least 70% by weight of monomeric units derived from vinyl chloride. The vinyl chloride polymers which can be employed for producing multilayer composites according to the invention comprise, therefore, both vinyl chloride homopolymers and its copolymers containing monomeric units derived from one or more comonomers and their mixtures. By way of examples of such vinyl chloride comonomers there may be mentioned, without any limitation being employed, olefins such as ethylene, propylene and styrene, and esters such as vinyl acetate and alkyl acrylates and methacrylates. Preference is given to vinyl chloride homopolymers.

A plasticized vinyl chloride polymer is intended to denote vinyl chloride polymers as defined above whose Shore A hardness, measured according to ASTM standard D2240, does not exceed 95, and preferably 90. The Shore A hardness is usually equal to at least 60. By way of examples of such plasticized polymers there may be mentioned those containing approximately 35 to 75 parts by weight of plasticizer, and, preferably, at least 40 parts by weight of plasticizer per 100 parts by weight of vinyl chloride polymer. The plasticizers which can be employed may be chosen equally well from the usual monomeric or polymeric plasticizers for vinyl chloride polymers. Without any limitation being employed, examples of such plasticizers which may be mentioned are phthalates, sebacates, adipates, trimellitates, citrates, phosphates and polyesters such as poly-ϵ-caprolactone and mixtures thereof.

It is also possible to use so-called internally plasticized vinyl chloride polymers obtained by copolymerization of vinyl chloride with plasticizing comonomers, such as, for example, ethylhexyl acrylate.

It is obvious that each of the constituent polymers of the multilayer structures according to the invention may comprise the usual additives employed in the applications of this polymer, such as, for example, lubricants, plasticizers, heat stabilizers, light stabilizers, particulate or fibrous fillers, pigments, and the like. It is particularly advantageous to incorporate a stabilizer against ultraviolet rays in the vinylidene fluoride polymer or else in the adhesive polymers, with a view to protecting the plasticized vinyl chloride polymer. Similarly, it may be advantageous to incorporate a small quantity, for example up to approximately 10% by weight, of adhesive polymers in the constituent polymers of the multilayer structures.

The method by which the multilayer structures according to the invention are obtained is not critical. All the usual techniques for assembling polymeric layers may therefore be employed to produce the multilayer structures according to the invention. As an example of such a method there may be mentioned thermal bonding by means of a solution of the mixture of polymeric adhesives in a suitable solvent or solvent mixture. Solvents which are suitable for this assembly method are, for example, chlorinated hydrocarbons such as methylene chloride, ketones such as acetone and methyl ethyl ketone, ethers such as tetrahydrofuran and esters such as ethyl acetate, and mixtures thereof. Nevertheless, preference is given to tetrahydrofuran. In practice, thermal bonding by means of a solution of the mixture of polymeric adhesives is carried out by cold coating, for example by means of a doctor blade, a film, a sheet or a plaque of vinylidene fluoride polymer (or of plasticized vinyl chloride polymer) with a solution of the mixture of adhesives, drying the coat and pressing the coated (adhesive-precoated) film, sheet or plaque, with heating, onto a film, a sheet or a plaque of plasticized vinyl chloride polymer (or of vinylidene fluoride polymer).

The optimum temperature and time of thermal bonding will be evaluated experimentally in each particular case. They depend, in particular, on the nature of the vinylidene fluoride and vinyl chloride polymers, the thickness of the assembled polymeric layers and the processing additives which may be incorporated in the various polymers.

Other usual methods of assembling polymeric layers which are suitable for producing the multilayer structures according to the invention are those in which the constituent polymers are employed at a temperature which is at least equal to their softening temperature, such as thermal lamination (hot pressing of polymeric layers preformed, for example, by extrusion), coextrusion and coextrusion-lining.

Structures with multiple polymeric layers which are given preference are those resulting from an assembly by thermal bonding or by thermal lamination, by coextrusion or by coextrusion-lining, and which comprise three layers, a layer of vinylidene fluoride polymer, a layer consisting of the mixture of adhesive polymers according to the invention and a layer of plasticized vinyl chloride polymer in this case and in this order.

The thickness of the polymeric layers forming part of the structures with polymeric layers according to the invention and the total thickness of the said structures are not critical and depend, understandably, on the application for which they are intended. The multilayer structures according to the invention may therefore be in the form of films, sheets, tubes, beverage packs and flexible pouches. They may be employed advantageously in fields of application where a high adhesion when heated, combined with high chemical inertness or resistance to ultraviolet rays are required. By way of practical examples of use of multilayer composites according to the invention, there may be mentioned, without any limitation being employed, the manufacture of waterproof awnings and sheets liable to be exposed to sunlight and seat covers and trim for motor cars.

The structures with multiple polymeric layers according to the invention are particularly suitable for the manufacture of flexible packaging for alimentary, pharmaceutical and cosmetological products and, still more particularly, for the manufacture of sterilizable pouches and packs for packaging nutrient and physiological liquids and, in particular, pouches for blood, for solution or for dialysis.

The examples which follow are intended to illustrate the invention.

Examples 1 and 2, according to the invention, relate to three-layer structures obtained by coextrusion.

Examples 3 to 10, according to the invention, and examples 11 to 16, for comparison, relate to three-layer structures obtained by thermal bonding.

In all the examples the vinylidene fluoride polymer is a vinylidene fluoride homopolymer marketed by SOLVAY & Cie under the registered trade mark Solef, type 1008.

In all the examples, the plasticized vinyl chloride polymer is a vinyl chloride homopolymer.

In examples 1 and 2 a composition based on polyvinyl chloride with a K value of 71 (100 parts by weight) containing diethylhexyl phthalate (44 parts), epoxidized soya oil (4.2 parts) and a calcium-zinc stabilizer (0.4 parts) was employed for the coextrusion. In examples 3 to 16, a sheet made of plasticized polyvinyl chloride marketed by Alkor GmbH Kunststoffe under the registered trade mark Alkorplan, type 35070 was employed for thermal bonding.

The composition of the polymeric adhesives employed in examples 1 to 16, namely that of the copolymers of vinyl chloride and of vinyl acetate (VC-VAC COP) (adhesives I) and of the copolymers of vinyl acetate and of ethylene (VAC-E COP) (adhesives II) is set out in the appended table. Also shown in this table are, the composition of the mixtures of polymeric adhesives employed and, in particular, the weight proportion of the adhesives I and II, the weight content of vinyl acetate in the mixtures, expressed in percent [VAC], their dynamic viscosity at 100° C. and 1 s$^{-1}$, $\eta$, expressed in kPa s and, finally, the product [VAC]$\eta$.

The dynamic viscosity of the mixtures of polymeric adhesives is evaluated in a rheometer which makes it possible to measure the dynamic mechanical properties of the polymers from the vitreous or crystalline state to the molten state. The measurements are performed on discs from 1 to 2 mm in thickness and 2.5 cm in diameter, taken from samples prepared from solutions at a concentration of 15–20% by weight of the mixtures of polymeric adhesives in tetrahydrofuran. After evaporation of tetrahydrofuran during 48 hours at ambient temperature, the polymeric residue is heated to 100° C. for 2 minutes and is then pressed for 2 minutes at 100° C. under a pressure of 80 bars. The pressed sample is then cooled under a pressure of 80 bars, to ambient temperature, after which it is cut into discs.

The measurement consists in determining the moduli G' and G" at a frequency of 0.16 cycles per second, that is to say for a velocity gradient of 1 s$^{-1}$ and at a temperature of 100° C. The dynamic viscosity at 100° C. and 1 s$^{-1}$ is then calculated by means of the following formula:

$$\eta = \frac{G'^2 + G''^2}{2\pi\nu}$$

Examples 1 and 2 relate to a three-layer coextruded tubular structure comprising, in this order, a layer (A) of vinylidene fluoride homopolymer (thickness: 74 μm), a layer (B) of a mixture of a copolymer of vinyl acetate and of ethylene and of a copolymer of vinyl chloride and acetate (thickness: 128 μm) (cf. appended table) and a layer (C) of flexible polyvinyl chloride (thickness: 338 μm). Three extruders (A) (B) and (C) feeding a coextrusion head are arranged to manufacture the three-layer coextruded structures of examples 1 and 2. The heating temperatures displayed from the feed zone to the pumping zone respectively are:

| | |
|---|---|
| 200° C.–210° C. | in extruder A |
| 143° C.–151° C. | in extruder B |
| 115° C.–143° C.–160° C. | in extruder C |

The extruders A, B and C supply the layers A, B and C of the coextruded structure respectively.

Examples 3 to 16 relate to the thermal bonding of a layer of vinylidene fluoride homopolymer (film with a thickness of 70 μm) onto a sheet of plasticized polyvinyl chloride (thickness: 1.5 mm) by means of the polymeric adhesives shown in detail in the appended table.

The polyvinylidene fluoride film is coated with a solution of polymeric adhesive(s) at a concentration of 15–20% by weight in tetrahydrofuran using a 200 μm wire spreader, the coat is dried directly after the coating for 3 minutes in a ventilated drying oven heated to 80° C. The total thickness of the dry coat is 30–40 μm, depending on the concentration of polymeric adhesive(s). The precoated polyvinylidene fluoride film is pressed with heating onto a plasticized polyvinyl chloride sheet for 1 minute 30 seconds and under a pressure of 30 bars in a press maintained at 140° C., and the composite is then transferred to a cold press and is kept therein at ambient temperature for 8 minutes under the same pressure.

The results of the evaluation of the adhesion, measured as the peel strength of the multilayer structures according to examples 1 to 16 are set out in the appended table. The peel strength is measured in a tensometer according to a method derived from ASTM standard D 1876-72. Before the measurement, the samples are conditioned in a constant temperature room at 23° C. for 24 hours (adhesion at 23° C.), or in a ventilated oven at 80° C. for 20 minutes (adhesion at 80° C.).

TABLE

| | Polymeric adhesives | | | | | Mixtures of polymeric adhesives | | | | Adhesion, newton/cm | |
|---|---|---|---|---|---|---|---|---|---|---|---|
| | VC-VAC COP (adhesives I) | | VAC-E COP (adhesives II) | | | | | | | | |
| | Acetate content % by weight | K value | Acetate content % by weight | MI* | Proportion by weight I:II | [VAC] | $\eta$, kPa s | [VAC]$\eta$ | at 23° C. | at 80° C. |
| 1 | 15 | 50 | 85 | | 1.95 | 25:75 | 67.5 | 60 | 4 × 10$^3$ | 13 | 3.2 |
| 2 | 15 | 50 | 85 | | 1.95 | 50:50 | 50 | 100 | 5 × 10$^3$ | 12.5 | 3.1 |
| 3 | 10 | 60 | 93 | | 2.59 | 50:50 | 51.5 | 83.7 | 4.3 × 10$^3$ | 12.7 | 3.5 |
| 4 | 10 | 60 | 65.5 | | 2.21 | 25:75 | 51.7 | 106 | 5.4 × 10$^3$ | 12.9 | 3 |
| 5 | 10 | 60 | 93 | | 2.59 | 10:90 | 85.75 | 65 | 5.5 × 10$^3$ | 12.15 | 3.4 |
| 6 | 10 | 60 | 82 | | 1.65 | 50:50 | 46 | 131 | 6.0 × 10$^3$ | 13 | 3.5 |

TABLE-continued

| | Polymeric adhesives | | | | | | | | | |
|---|---|---|---|---|---|---|---|---|---|---|
| | VC-VAC COP (adhesives I) | | VAC-E COP (adhesives II) | | Mixtures of polymeric adhesives | | | | Adhesion, newton/cm | |
| | Acetate content % by weight | K value | Acetate content % by weight | MI* | Proportion by weight I:II | \|VAC\| | $\eta$, kPa s | \|VAC\|$\eta$ | at 23° C. | at 80° C. |
| 7 | 10 | 60 | 93 | 2.59 | 25:75 | 72.25 | 93 | $6.7 \times 10^3$ | 13 | 4 |
| 8 | 10 | 60 | 65.5 | 2.21 | 10:90 | 60 | 61 | $3.6 \times 10^3$ | 12.9 | 3.5 |
| 9 | 10 | 60 | 82 | 1.65 | 25:75 | 64 | 117 | $7.4 \times 10^3$ | 13 | 3 |
| 10 | 10 | 60 | 65.5 | 2.21 | 50:50 | 37.75 | 111 | $4.2 \times 10^3$ | 13.1 | 3.1 |
| 11 | — | — | 56 | 103 | 0:100 | 56 | 12 | $0.67 \times 10^3$ | 4.9 | 0.13 |
| 12 | — | — | 68 | 89 | 0:100 | 68 | 10 | $0.68 \times 10^3$ | 4.2 | 0.10 |
| 13 | 10 | 60 | 70 | 401 | 25:75 | 55 | 10 | $0.55 \times 10^3$ | 5.2 | 0.40 |
| 14 | 10 | 60 | 56 | 103 | 10:90 | 51.9 | 49 | $2.5 \times 10^3$ | 6.5 | 0.50 |
| 15 | 10 | 60 | 56 | 103 | 50:50 | 35.5 | 80 | $2.8 \times 10^3$ | 4.9 | 0.90 |
| 16 | 10 | 60 | 68 | 89 | 10:90 | 62.7 | 15 | $0.94 \times 10^3$ | 4.9 | 0.10 |

*MI: Melt index measured at 170° C. under a 10 kg load

I claim:

1. Structures with multiple polymeric layers comprising a layer of vinylidene fluoride polymer bonded to a layer of plasticized vinyl chloride polymer, which are characterized in that the layer of vinylidene fluoride polymer is bonded to the layer of plasticized vinyl chloride polymer by means of a mixture of polymeric adhesives consisting of a copolymer of vinyl acetate and of ethylene and of a copolymer of vinyl chloride and of vinyl acetate, the said mixture containing from 36 to 95% by weight of vinyl acetate and exhibiting a dynamic viscosity equal to at least 55 kPa s at 100° C. and 1 s$^{-1}$, 2. Structures with multiple polymeric layers according to claim 1, characterized in that the mixture of polymeric adhesives contains from 36 to 90% by weight of vinyl acetate and exhibits a dynamic viscosity equal to at least 60 kPa s at 100° C. and 1 s$^{-1}$.

3. Structures with multiple polymeric layers according to claim 1, characterized in that the copolymer of vinyl acetate and of ethylene is a binary copolymer of vinyl acetate and of ethylene containing from 60 to 99% by weight of vinyl acetate.

4. Structures with multiple polymeric layers according to claim 1, characterized in that the copolymer of vinyl chloride and of vinyl acetate is a binary copolymer of vinyl chloride and of vinyl acetate containing from 60 to 98% by weight of vinyl chloride.

5. Structures with multiple polymeric layers according to claim 1, characterized in that the product of the weight content of vinyl acetate, expressed in percent, multiplied by the dynamic viscosity at 100° C. and 1 s$^{-1}$, expressed in kPa s, is greater than $3 \times 10^3$.

6. Structures with multiple polymeric layers according to claim 5, characterized in that the product is greater than $3.5 \times 10^3$.

7. Structures with multiple polymeric layers according to claim 1, characterized in that the vinylidene fluoride polymer contains at least 90 mol% of monomeric units derived from vinylidene fluoride.

8. Structures with multiple polymeric layers according to any one of claims 1 to 4, characterized in that the plasticized vinyl chloride polymer is a plasticized vinyl chloride homopolymer.

* * * * *